United States Patent
Sueishi

(10) Patent No.: US 8,100,158 B2
(45) Date of Patent: Jan. 24, 2012

(54) OFF-ROAD TIRE WITH TREAD HAVING BLOCKS AND RECESSES

(75) Inventor: Makoto Sueishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1030 days.

(21) Appl. No.: 11/979,604

(22) Filed: Nov. 6, 2007

(65) Prior Publication Data

US 2008/0110542 A1    May 15, 2008

(30) Foreign Application Priority Data

Nov. 13, 2006 (JP) ................................. 2006-307017

(51) Int. Cl.
*B60C 11/11* (2006.01)
(52) U.S. Cl. ......... 152/209.12; 152/209.11; 152/209.17; 152/902
(58) Field of Classification Search ............. 152/209.11, 152/209.12, 209.17, 209.18, 902
See application file for complete search history.

(56) References Cited

U.S. PATENT DOCUMENTS

| | | | | |
|---|---|---|---|---|
| 4,222,424 A | * | 9/1980 | Tsuzura et al. | .......... 152/209.12 |
| 4,617,976 A | * | 10/1986 | Kawajiri | .................. 152/209.11 |
| 5,203,933 A | * | 4/1993 | Nagahisa | .................. 152/209.17 |
| 2006/0065340 A1 | * | 3/2006 | Goetz | ....................... 152/209.17 |

FOREIGN PATENT DOCUMENTS

| | | |
|---|---|---|
| EP | 1 266 771 A1 | 12/2002 |
| JP | 60-159040 | * 8/1985 |
| JP | 63-154407 | * 6/1988 |
| JP | 8-268011 A | 10/1996 |
| JP | 2004-351956 | * 12/2004 |

OTHER PUBLICATIONS

Machine translation for Japan 2004-351956 (no date).*

* cited by examiner

*Primary Examiner* — Steven D Maki

(74) *Attorney, Agent, or Firm* — Birch, Stewart, Kolasch & Birch, LLP

(57) ABSTRACT

An off-road tire (1) comprises a tread portion (2) provided with blocks (10, 11) forming a sea area (8) therearound. The sea area (8) is provided in the bottom (14) thereof with recesses (13), wherein the recesses (13) are arranged circumferentially of the tire and each extend axially of the tire, and the depth (d) of each of the recesses (13) is gradually increased towards its center (13*a*), whereby the enveloping power is improved.

3 Claims, 5 Drawing Sheets

OFF-ROAD TIRE WITH TREAD HAVING BLOCKS AND RECESSES

BACKGROUND OF THE INVENTION

The present invention relates to a pneumatic tire, more particularly to a tread structure for off-road tires capable of improving the enveloping power.

Off-road tires, especially tires used in rough terrains such as pneumatic tires for motocross bikes or rally cars, are required to have so called enveloping power, namely, an ability to conform to the road surface easily so as to absorb shock and reduce vibration during running. In the case of rear tires of the motocross bikes in particular, such request for high enveloping power is strong in order to lessen fatigue of the driver or rider.

SUMMARY OF THE INVENTION

It is therefore, an object of the present invention to provide an off-road tire in which, by providing a block-based specific tread pattern, the enveloping power is increased to improve ride comfort and thereby to lessen the driver's fatigue.

According to the present invention, an off-road tire comprises a tread portion provided with blocks forming a sea area therearound, wherein the bottom of the sea area is provided with recesses, the recesses are arranged circumferentially of the tire and each extend axially of the tire, and the depth of each of the recesses is gradually increased towards its center.

Therefore, the recesses decreases the rigidity of the base of the tread portion between the blocks, and accordingly, the tread portion can conform to protrusions of the road surface. Thus, the enveloping power can be improved.

DESCRIPTION OF THE PREFERRED EMBODIMENTS

Figure 1:
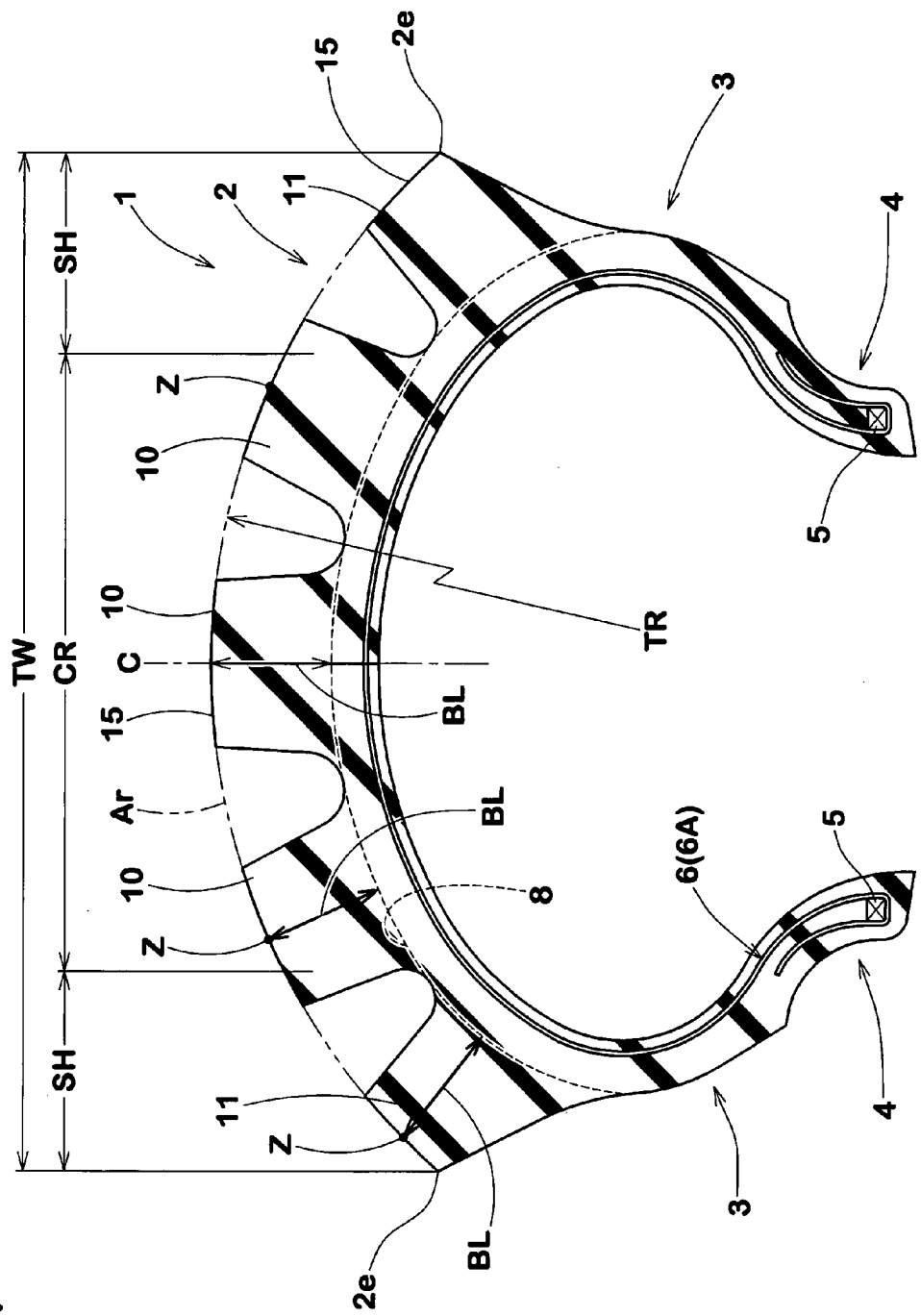
FIG. 1 is a cross sectional view of an off-road tire according to the present invention.

Embodiments of the present invention will now be described in detail in conjunction with accompanying drawings.

According to the present invention, off-road tire 1 is a pneumatic tire designed to be used in motocross races, car rallys or the like, and comprises a tread portion 2, a pair of sidewall portions 3, a pair of bead portions 4 with a bead core 5 therein, a carcass 6 extending between the bead portions 4 as usual. The carcass 6 is composed of a rubberized ply 6A of organic fiber cords extending between the bead portions 4 and the edges thereof are turned up around the bead cores 5 to be secured thereto. In the tread portion 2, a tread reinforcing cord layer (not shown) so called breaker, belt or band is disposed depending on the carcass structure, namely, radial or bias structure as well known in the tire art.

The tread portion 2 is provided with a block pattern defined by a plurality of blocks 10 and 11 only, namely there is no rib, and a sea area (corresponding to "grooved area" of a street tire) is formed around the blocks.

The off-road tire 1 shown in FIG. 1 as an embodiment of the present invention is a motorcycle tire. Thus, the tread profile (Ar) has a relatively small radius TR when compared with automobile tires, and as a result, the maximum tire section width occurs between the tread edges 2e, namely, the tread width TW equals to the maximum tire section width. Usually, the radius TR of tread curvature is set in a range of from 40 to 60 mm in the case of a front tire. In the case of a rear tire, the radius TR is set in a range of from 45 to 110 mm.

The tread width TW hereinafter referred is the axial distance between the tread edges 2e under the normally inflated unloaded condition of the tire. In the case of the motorcycle tires, if the tread edges 2e are unclear, the maximum tire section width can be used as the tread width TW. In the case of tires other than motorcycle tires, namely, tires for three or more-wheeled vehicles, the tread width TW is defined as the axial distance between the tread edges measured in a normally inflated unloaded condition of the tire. Here, the tread edges are the axial outermost edges of the ground contacting patch (camber angle=0) in a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

Unless otherwise noted, dimensions refer to those measured under the normally inflated unloaded condition.

Figure 2:
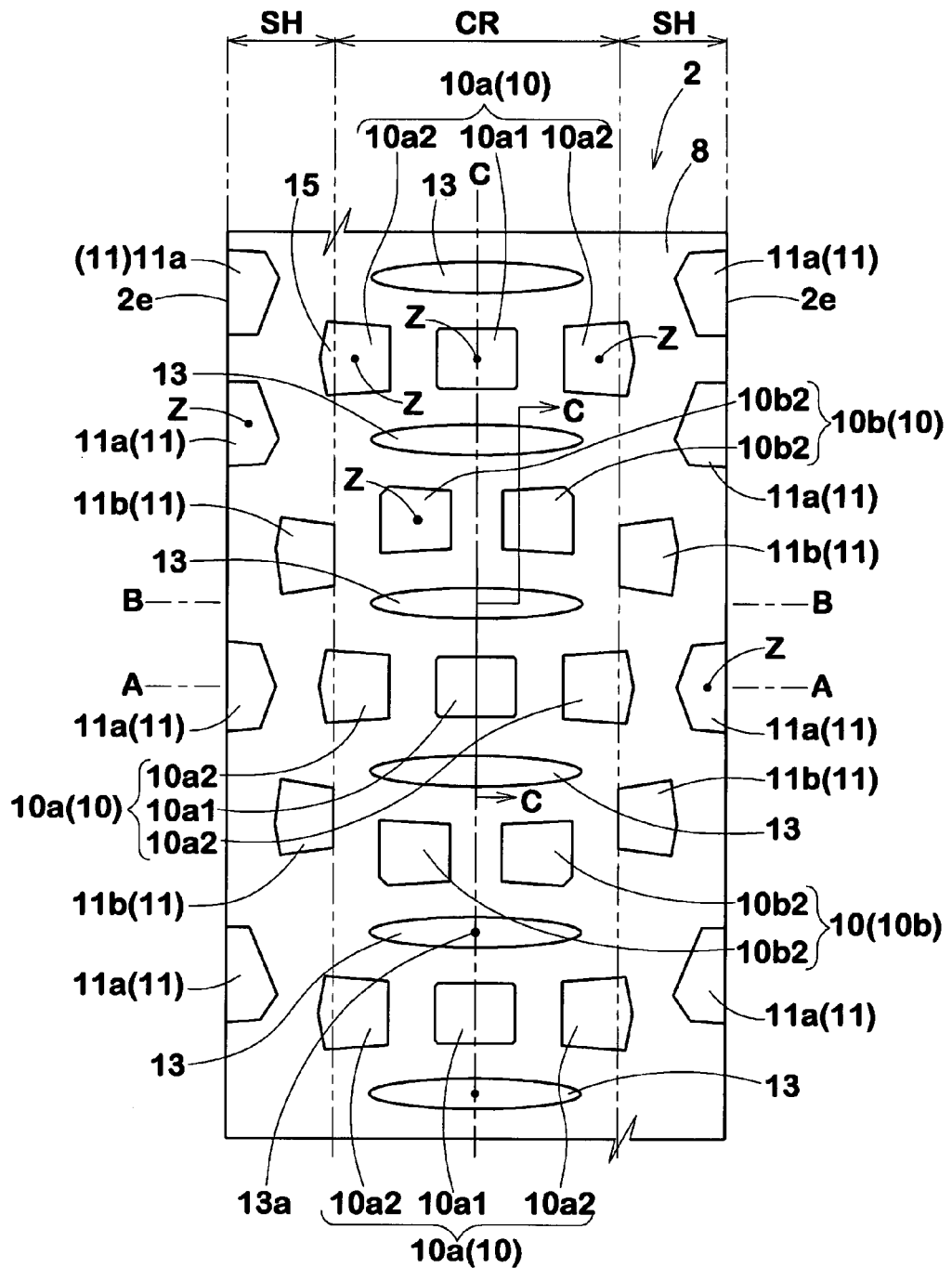
FIG. 2 shows a developed tread pattern according to the present invention.

FIG. 2 shows an example of the block pattern according to the present invention.

In this example, the blocks 10 and 11 are arranged sparsely in the tread portion 2, and the land ratio (sb/s) of the tread portion is set in a range of not less than 5%, preferably not less than 10%, but not more than 35%, preferably not more than 30%. Incidentally, the land ratio (sb/s) is a ratio of the total area sb of the ground contacting top surfaces of all of the blocks 10 and 11 to the gross area S of the tread portion 2.

Preferably, the heights BL of the blocks 10 and 11 (or the depth of the sea area 8) are set in a range of not less than 10.0 mm, more preferably not less than 11.0 mm, but not more than 19.0 mm, more preferably not more than 18.0 mm.

Here, The blocks 10 denote crown blocks 10 disposed in the tread crown region CR such that the centroid Z of the ground contacting top face 15 is included in this region CR. The blocks 11 denote shoulder blocks 11 disposed in the tread shoulder region SH such that the centroid Z of the ground contacting top face 15 is included in this region SH. The tread crown region CR has 60% width of the tread width TW and centered on the tire equator C. The tread shoulder region SH is located on each side of the crown region CR and has 20% width of the tread width TW.

The crown blocks 10 are arranged in a plurality of axial rows 10 disposed around the tire circumference at intervals, wherein each of the axial rows 10 is made up of at least two of the crown blocks 10 aligned along an axial line in order to provide running stability during straight running. When the blocks constituting a row have different shapes, usually the centroids of the top faces 15 are aligned.

In this embodiment, the axial block rows 10 have two-types 10a and 10b being different in the number of the blocks and alternately disposed in the tire circumferential direction.

In the example shown in FIG. 1, the first row 10a is made up of three blocks: one block disposed on the tire equator c (hereinafter, the central crown block 10a1); and a pair of blocks disposed one on each side of the central crown blocks 10a1, symmetrically about the tire equator C (hereinafter, the outer crown blocks 10a2).
The second rows 10b is made up of two blocks disposed one on each side of the tire equator C, symmetrically about the tire equator C.

The shoulder blocks 11 are axially outer shoulder blocks 11a arranged along the tread edges 2e, and axially inner shoulder blocks 11b arranged along the boundary lines between the tread shoulder regions SH and tread crown region CR. Thus, in each of the shoulder regions SK, the shoulder blocks 11 are arranged in two circumferential rows. Further, in each of the tread shoulder regions SH, the axially outer shoulder blocks 11a and axially inner shoulder blocks 11b are staggered.

The shapes of the top faces 15 of the crown blocks 10 are a rectangle (blocks 10a1) and pentagons (blocks 10a2 and 10b2) close to a rectangle, wherein the rectangles have edges almost parallel with the axial direction and circumferential direction. The shapes of the top faces 15 of the shoulder blocks 11 are pentagons, and the size of each shoulder block 11 is larger in the tire circumferential direction than the tire axial direction to improve the traction during cornering.

According to the present invention, the bottom 14 of the sea area 8 is provided with recesses 13.

In the case of motorcycle tires, one of the tread shoulder regions SH comes into contact with the road surface during cornering, and need to generate a large camber thrust against the centrifugal force. Accordingly, the rigidity of the shoulder regions SH should not be decreased, therefore no recess is formed in the shoulder regions SH. The recesses 13 are provided in the tread crown region CR only. In the case of a tire for three- or more-wheeled vehicles, however, the recesses may be formed in the tread shoulder regions SH.

The recesses 13 extend in parallel with the tire axial direction so that the length in the tire axial direction becomes larger than the width in the tire circumferential direction, and the depth (d) is gradually increased towards the center 13a thereof. The maximum depth (d) is preferably set in a range of from 3 to 25% of the radial height BL of the blocks. Usually, in the case of motorcycle tires, the maximum depth (d) is set in a range of 0.5 to 3.0 mm.

In the example of the tread pattern shown in FIG. 1, one recess 13 is disposed in every space between the circumferentially adjacent block rows 10 (namely, between 10a and 10b), and all of the recesses 13 are centered on the tire equator C. The shape of the recess 13 is symmetrical about the tire equator C.

Figure 5:
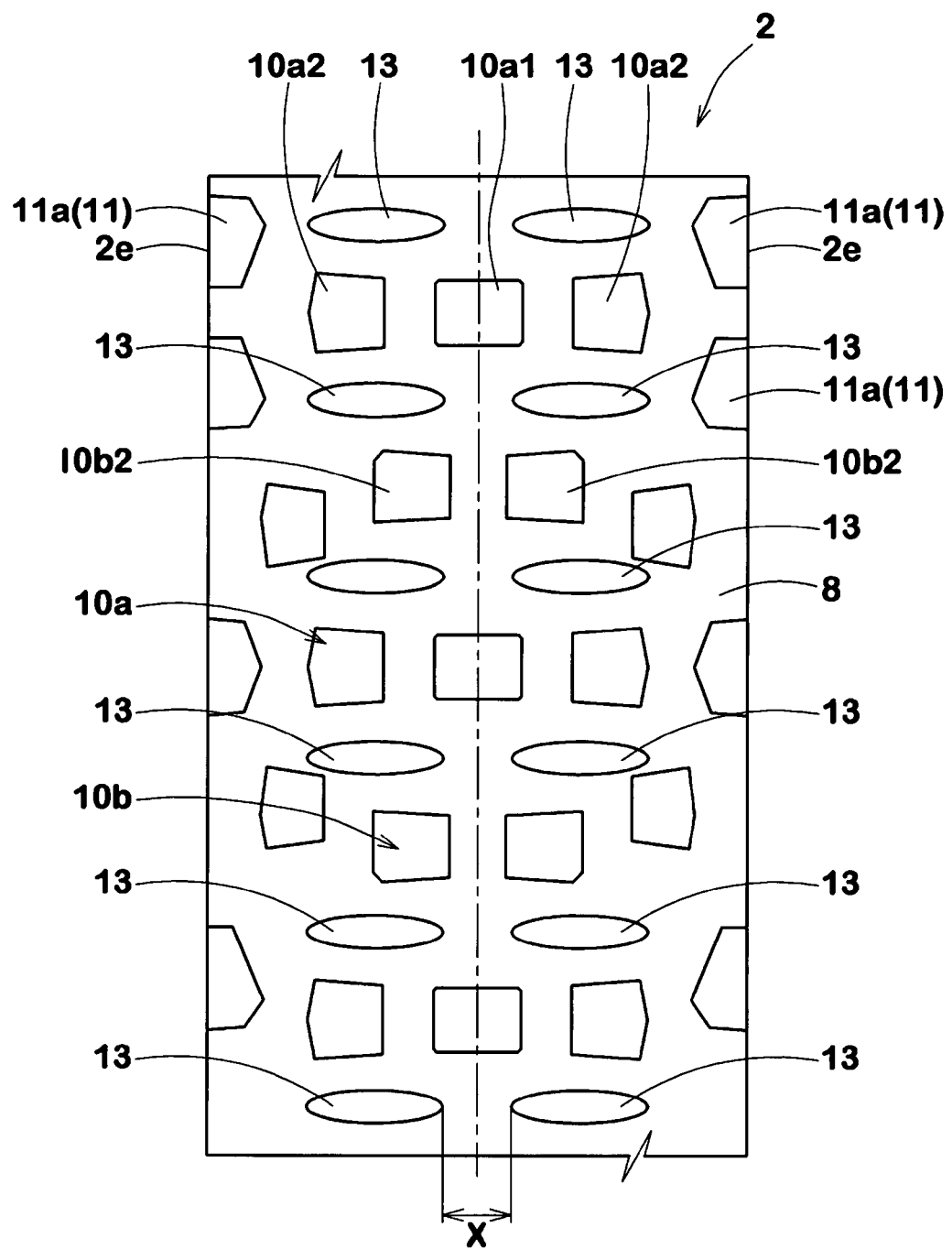
FIG. 5 shows a developed tread pattern according to the present invention.

FIG. 5 shows another example of the tread pattern which is a slight modification of the tread pattern shown in FIG. 2. In this example, two recesses 13 are formed in every space between the circumferentially adjacent block rows 10, and the two recesses 13 are disposed one on each side of the tire equator C. In this case, the tread rigidity near the tire equator c increases when compared with the example shown in FIG. 1. Thus, running stability during straight running can be improved. In this light, it is preferable that the axial distance X between the paired recesses 13 is not less than 20 mm, and the paired recesses 13 are symmetrical about the tire equator C in respect of their shapes and positions.

As a further example (not shown) of the tread pattern, the single recess of the FIG. 1 example and the paired recesses of the FIG. 5 example can be combined for example by arranging alternately in the tire circumferential direction.

In any case, the surface of the recess 13 is smoothly concavely curved, and it is preferable that, in a cross section parallel with the tire equatorial plane C, the contour of the recess 13 is a substantially circular arc whose radius Rc1 is not less than 2 mm but not more than 100 mm. If the radius Rc1 is less than 2 mm, a large stress concentrates in a narrow area, therefore it is not preferable. If the radius Rc1 is more than 100 mm, the enveloping power can not be improved.

Figure 3:
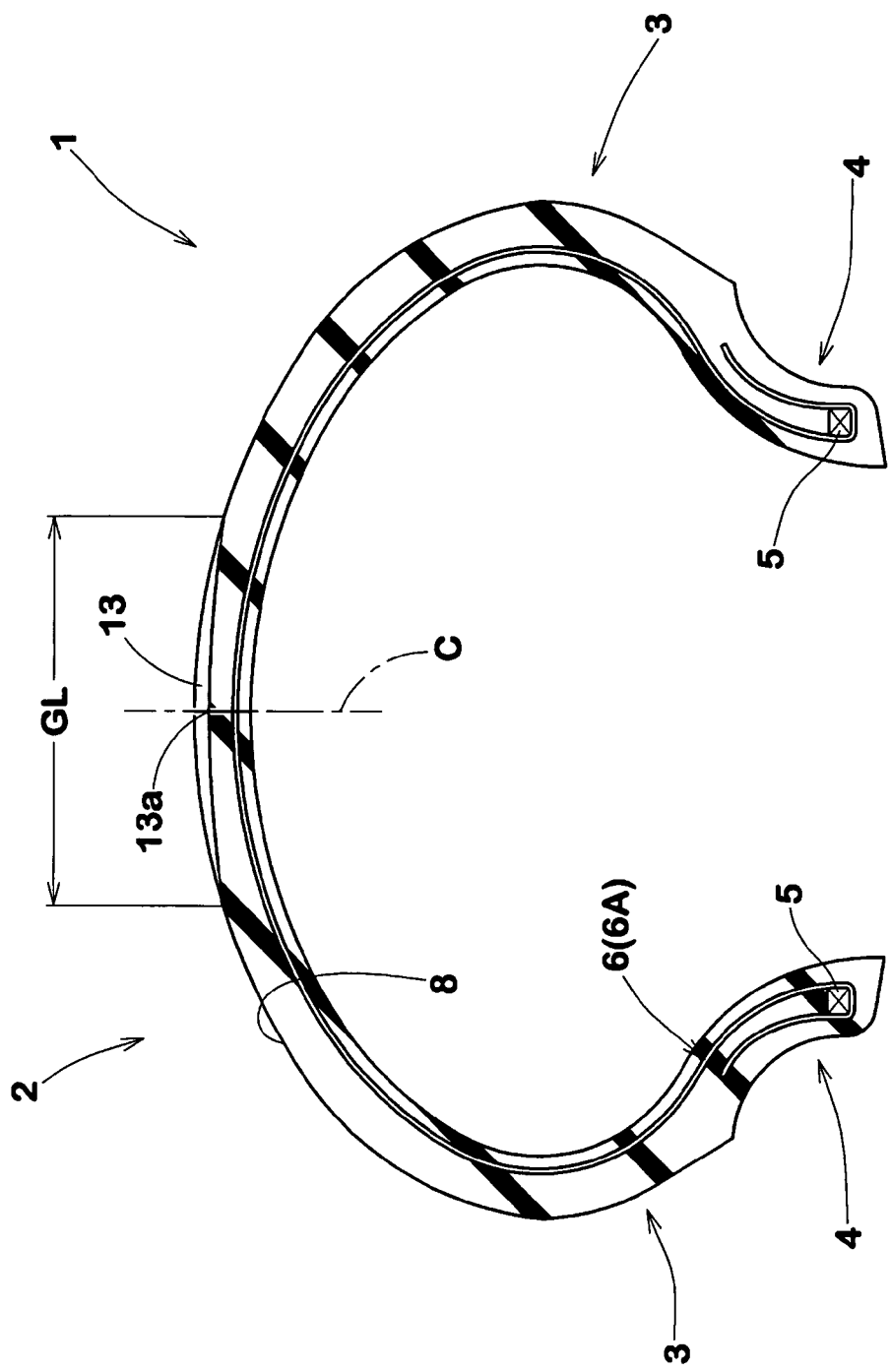
FIG. 3 is a cross sectional view of the tire taken along line B-B in FIG. 2.
Figure 4:
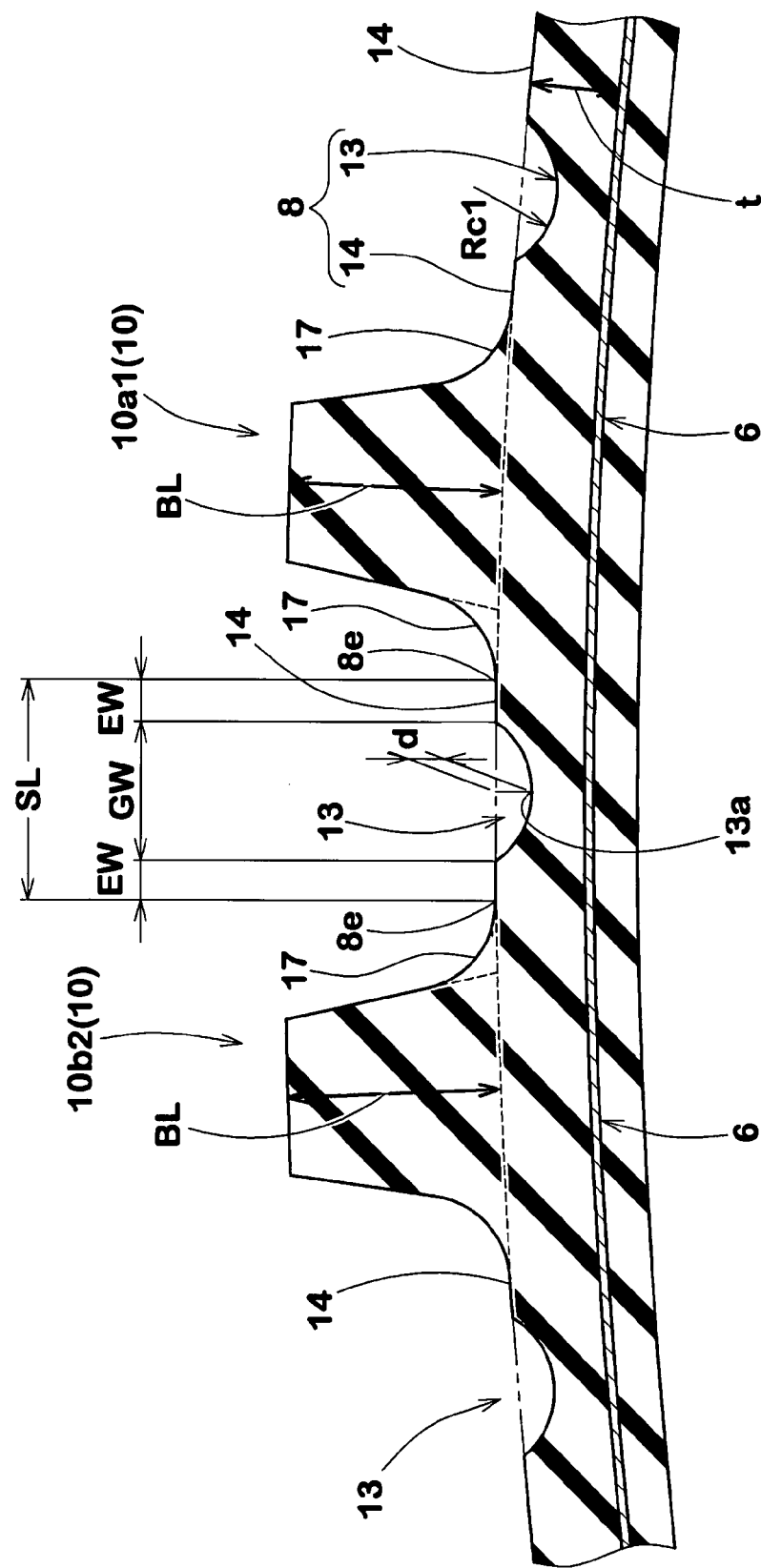
FIG. 4 is an enlarged cross sectional view of the recess taken along line C-C in FIG. 2.

Accordingly, in a cross section parallel with the tire equatorial plane C, the depth of each recess 13 is gradually decreased towards the center 13a from the both sides as shown in FIG. 4. Also, in a meridian cross section including the tire rotational axis, the depth of each recess 13 is gradually decreased from the axial ends towards the center 13a as shown in FIG. 3.

The axial length GL of the single recess 13 (FIG. 2) or the total GL of the axial lengths of the plural recesses 13 (FIG. 5) disposed at one circumferential position is preferably in a range of not less than 10%, more preferably not less than 20%, but not more than 80%, more preferably not more than 70% of the tread width TW. If the axial length GL or the total GL is less than 10%, the shock absorbing effect can not be obtained. If GL is more than 80%, the tread portion 2 is greatly decreased in the rigidity and the steering stability is deteriorated.

As shown in FIG. 4, all of the side faces of each block (10, 11) extends linearly from the block top to a certain depth and then through a concavely curved part 17 thereof, merges into the bottom 14 of the sea area 8, therefore, the size of the block increases from the block top to the root and reaches to the maximum at the lower edges 8e of the side faces. Between the recess and the blocks (lower edges 8e), flat portions (EW), namely, the bottom 14 of the sea area 8 are remained. Here, the term "flat" means that the depth from the tread profile line is constant, or the rubber thickness or distance (t) to the radially outermost reinforcing cord layer such as belt, breaker and carcass (in FIG. 4, the carcass 6) is constant.

In a cross section parallel with the tire equatorial plane C, as shown in FIG. 4, at the bottom 14 of the sea area 8, the width GW in the tire circumferential direction, of the recess 13 is in a range of from 5 to 95% of the minimum circumferential distance SL between the circumferentially adjacent crown blocks 10. If the width GW is less than 5%, a large stress concentrates in a narrow area, therefore it is not preferable. if the width GW is more than 95%, the enveloping power can not be improved. Preferably, the width EW of the above-mentioned flat portions, namely, the circumferential distance EW between the outer edge (8e) on the block side and the inner edge on the recess side of the flat portion, is set in a range of not less than 5% of the circumferential distance SL between the outer edges (8e) on both sides of the recess. Therefore, the blocks are improved in the resistance to being wrenched from the base of the tread and also increased in the rigidity to improve the steering stability.

comparison Test

Motorcycle tires of size 120/80-19 for rear wheel (rim size: 2.15 WM) were prepared and tested as follow. The test tires were provided with same tread patterns, excepting the recesses, as shown in FIG. 2.

<Enveloping Power>

Driving a 450 cc motocross bike in a motocross test course, ten test riders evaluated the enveloping power of each tire into five ranks based on Ref. tire being rank three. The average rank numbers of the ten riders are shown in Table 1. The larger the rank number, the better the enveloping power.
Tire pressure: 90 kPa <Driveability>

Driving the motocross bike mainly on the soft ground in the test course, the ten test riders evaluated the driveability of each tire into five ranks, based on the high speed stability during straight running and the cornering speed, the amount of tire skidding, the handling stability and the like during cornering. The average rank numbers of the ten riders are shown in Table 1. The larger the rank number, the better the driveability.

<Durability>

Driving the bike in the test course at full throttle for 20 minutes two times, the tread portion was checked for damage by the naked eye. The results are shown in Table 1.

TABLE 1

| Tire | Ref. | Ex. 1 | Ex. 2 | Ex. 3 | Ex. 4 | Ex. 5 | Ex. 6 | Ex. 7 |
|---|---|---|---|---|---|---|---|---|
| Tread width TW (mm) | 144 | 144 | 144 | 144 | 144 | 144 | 144 | 144 |
| Block height BL (mm) | — | 16.5 | 16.5 | 16.5 | 16.5 | 16.5 | 16.5 | 16.5 |
| Recess | none | FIG. 2 | FIG. 2 | FIG. 2 | FIG. 2 | FIG. 2 | FIG. 2 | FIG. 5 |
| GL/TW (%) | — | 40 | 90 | 5 | 40 | 40 | 40 | 20 × 2 |
| GW/SL (%) | — | 65 | 65 | 65 | 5 | 98 | 65 | 65 |
| Depth d (mm) | — | 1.0 | 1.0 | 1.0 | 1.0 | 1.0 | 0.3 | 1.0 |
| d/BL (%) | — | 6.1 | 6.1 | 6.1 | 6.1 | 6.1 | 6.1 | 6.1 |
| Enveloping power | 3.0 | 4.0 | 4.0 | 3.1 | 4.0 | 3.2 | 3.1 | 3.8 |
| Driveability | 3.0 | 3.8 | 3.0 | 3.0 | 2.5 | 3.0 | 3.0 | 4.0 |
| Durability *1 | OK | OK | OK | OK | OK | OK | OK | OK |

*1) OK = no damage

As apparent from Table 1, in the off-road tires according to the present invention, the enveloping power can be remarkably increased. Further, owing to the improved enveloping power, the driveability can be improved.

Aside form a motorcycle tire, the present invention can be applied to pneumatic tires for three-wheel buggy, four-wheel car and the like.

The invention claimed is:

1. An off-road tire comprising a tread portion provided with blocks forming a sea area therearound, wherein
said blocks include crown blocks disposed in a tread crown region such that the centroid of the ground contacting top face of each said crown block is positioned within a tread crown region, wherein the tread crown region is defined as having 60% width of a tread width and centered on the tire equator,
said crown blocks are arranged in a plurality of axial rows of two types which are first axial rows and second axial rows alternately disposed in the tire circumferential direction at intervals, wherein
each of the first axial rows is made up of three crown blocks aligned along an axial line of the tire, which are one central crown block disposed on the tire equator and a pair of outer crown blocks disposed one on each side of the central crown blocks symmetrically about the tire equator, and
each of the second axial rows is made up of two crown blocks which are aligned along the axial line and disposed one on each side of the tire equator symmetrically about the tire equator,
the sea area is provided in the bottom thereof with recesses such that every space between the circumferentially adjacent first axial row and second axial row is provided with a single recess centered on the tire equator and having a shape symmetrical about the tire equator,
the recesses are each oriented in parallel with the tire axial direction so that the recess has a width in the tire circumferential direction and a length in the tire axial direction which is larger than the width and in a range of from 10 to 80% of a tread width,
the recess extends axially outwardly beyond the radially outermost end of each of said two crown blocks of the second axial row,
the depth of each of the recesses is gradually increased towards its center, and
in a cross section parallel with the tire equatorial plane, the contour of the recess is a concave arc having a radius of curvature of not less than 2 mm and nor more than 100 mm, a flat portion of the bottom remaining on each side of the recess, and the flat portion being merged into a concavely curved part of the side face of the adjacent block,
in a cross section of the tire parallel with the tire equatorial plane, the circumferential width GW of the recess is in a range of from 65% to 95% of the circumferential width SL of the bottom of the sea area between the blocks circumferentially adjacent to the recess.

2. The off-road tire according to claim 1, wherein said shape of the recess is an ellipse.

3. The off-road tire according to claim 1, wherein the maximum depth of each of the recesses is in a range of from 3 to 25% of the radial height of the blocks circumferentially adjacent to the recess.

* * * * *